F. E. GRIFFETH.
ANTIRATTLER.
APPLICATION FILED DEC. 1, 1916.
1,238,135.
Patented Aug. 28, 1917.
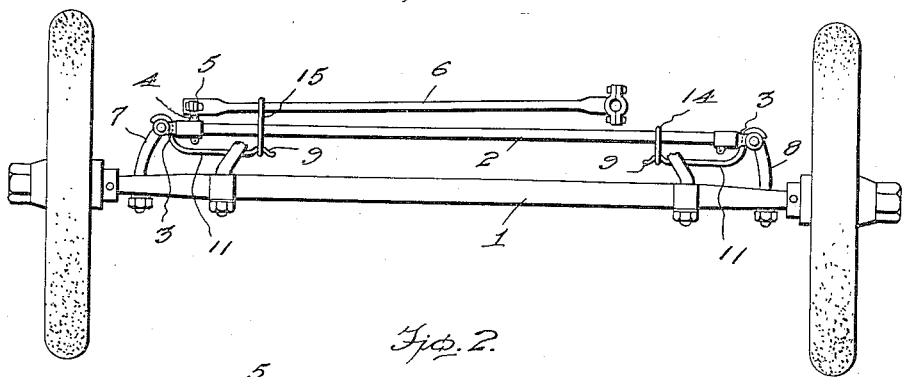
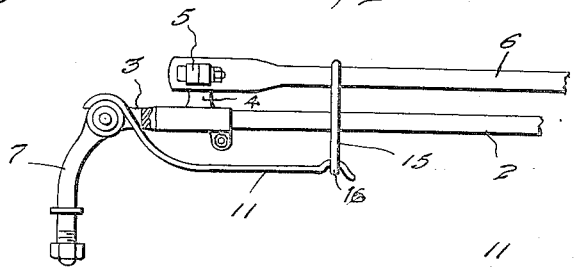
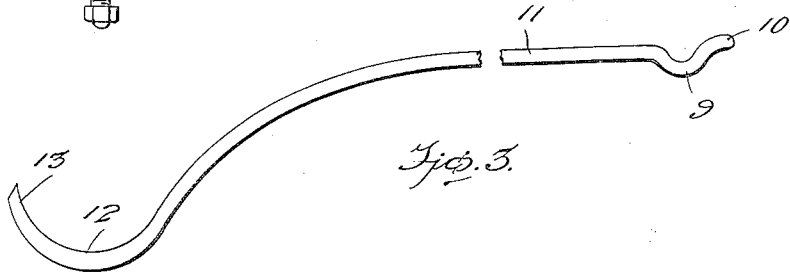
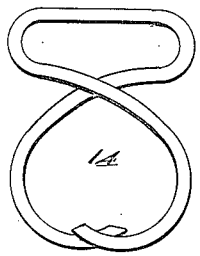
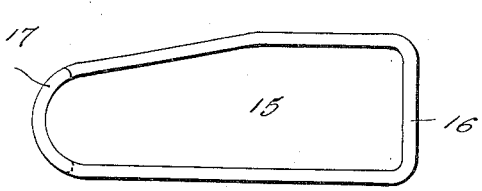
Inventor
Francis Emmett Griffeth
By Edson Bros,
Attorneys

UNITED STATES PATENT OFFICE.

FRANCIS EMMET GRIFFETH, OF ATHENS, GEORGIA.

ANTIRATTLER.

1,238,135.  Specification of Letters Patent.  Patented Aug. 28, 1917.

Application filed December 1, 1916. Serial No. 134,419.

*To all whom it may concern:*

Be it known that I, FRANCIS E. GRIFFETH, a citizen of the United States, residing at Athens, in the county of Clarke and State of Georgia, have invented certain new and useful Improvements in Antirattlers; and I do hereby declare the following to be a full, clear, and exact description of the invention, such as will enable others skilled in the art to which it appertains to make and use the same.

This invention is an anti-rattle device designed more particularly for use in connection with motor vehicles.

In some types of motor vehicles, the connections between members of the running gear are so mounted that after slight wear of the parts of the vehicle, the joints permit of play between the connecting means, thereby causing objectionable noises during the running of the vehicle. This has been found to exist particularly in relation to the spindle arm of connecting rods of the steering mechanism.

In overcoming the objectionable noise due to the vibration between the connecting members of the steering mechanism, there is employed a resilient plate so mounted with relation to the connecting rod and the spindle arm that it maintains the pivotal connecting means between the rod and spindle arm in frictional engagement. This resilient plate also serves to take the rattle out of the joint connecting the steering rod with the connecting rod.

The resilient plate is preferably an elongated member having a transverse depression formed near one end thereof to receive a binding element which maintains the plate in a predetermined position relative to the connecting rod, while the opposite end of the plate is preferably curved downwardly to form a seat which bears against the end of the spindle arm in its pivotal movements relative to the connecting rod.

Further objects and advantages of the invention will become apparent from the following detail description of the invention taken in connection with the accompanying drawings.

While a preferred embodiment of the invention is disclosed in the drawings, it is to be understood that the construction therein set forth is for the purposes of illustration only, and not as defining the limits of the invention.

In the drawings:—

Figure 1 is a plan view illustrating the application of the invention to the chassis of a motor vehicle.

Fig. 2 is an enlarged detail view of the device applied to a connecting rod with an end of the resilient plate bearing against the spindle arm and with the retaining means of the resilient plate suspended from the steering rod.

Fig. 3 is an enlarged detail view of the resilient plate.

Fig. 4 is a detail view of one of the connecting links which engages the resilient plate and the connecting rod.

Fig. 5 is a detail view of the elongated link which connects the resilient plate with the steering rod.

The invention is shown applied to the steering mechanism of a car commercially known as the Ford automobile, although it is obvious that the device may be used on other types of vehicles. The front axle of the vehicle is indicated at 1, and mounted substantially parallel with this axle is the connecting rod 2. This connecting rod is shown forked at each end, as indicated at 3. Near one of these forked ends is a spherical member 4 which is engaged by a socket member 5 carried by the steering rod indicated at 6.

Pivotally mounted within the forked ends 3 of the connecting rod 2, are the spindle arms 7, 8, of the usual construction.

An important feature of the invention resides in a resilient plate of particular construction shown more fully in Fig. 3. This plate may be formed of any suitable material, such as resilient steel, and provided at one end with a recessed portion indicated at 9 adjacent an outwardly directed end 10 of the plate. The main body of the plate is substantially straight, as indicated at 11, while the opposite end of the plate is preferably curved away from the plane of the body to the plate 11, so that the outer end has a downwardly directed portion 12 and an upwardly directed portion 13 in the form of a hook member.

The plate 11 is preferably mounted substantially parallel with the connecting rod 2, and when applied to the spindle arm 7, the hook-shaped bearing portion 13 is preferably seated against the rounded end of the spindle 7 which is positioned within the forked end 3 of the connecting rod 2, while the opposite end of the plate 11 is maintained under tension against the spindle arm 7 by means of the link 14 which is seated in the recess 9 and secured to the connecting rod 2. In this arrangement, the resilient plate 11 continuously bears against the spindle arm 7 and while it permits of the front pivotal movement of this arm, it places the arm in sufficient frictional engagement with its pivotal bolt as to prevent any objectionable noises, and at the same time preclude the working out of the connecting bolt due to the looseness and vibration of the parts. The opposite end of the connecting rod 2 is provided with a similar resilient plate 11, the hook end of which bears against the pivotal end of the spindle arm 8 to take up any looseness that may occur between the connecting bolt, the spindle arm and the connecting rod. This resilient plate 11, may serve also to take up any looseness and prevent any objectionable noise in the ball and socket joint connection 4, 5 between the steering rod 6 and the connecting rod 2. This is accomplished by means of the link 15, which extends from the steering rod 6 and has one portion 16 seated in the recess 9 of the plate 11.

The link 15 is preferably trapezoidal in form, and may be produced from a single strip of metal bent into the form desired, with the ends of the metal terminating in curved overlapped relation as indicated at 17.

It is obvious that various changes may be made in the form and proportion of parts to adapt the invention to other types of vehicles, and the right is reserved to make such changes and alterations as fairly fall within the scope of the appended claims.

Having thus described the invention, what is claimed as new is:—

1. In a vehicle, a connecting rod having a forked end, a spindle, means to pivotally mount the spindle within the forked end of the rod, a resilient plate having a curved end which is extended between the pivotal end of the spindle and the forked end of the rod to bear against the pivotal end of the spindle, a steering rod mounted adjacent to the connecting rod, and means carried by the steering rod to engage another portion of the resilient plate to maintain the said plate in a predetermined position.

2. In a vehicle, a connecting rod having a forked end, a spindle, means to pivotally mount the spindle within the forked end of the rod, a resilient plate having a portion thereof formed to engage the end of the spindle which is positioned between the forked end of the connecting rod, a steering rod mounted substantially parallel with the connecting rod, and a trapezoidal link mounted from the steering rod and positioned around the connecting rod to have the broad end of said link seated in a recessed portion of said resilient plate.

In testimony whereof I affix my signature in presence of two witnesses.

FRANCIS EMMET GRIFFETH.

Witnesses:
  L. L. MAXWELL,
  ALMA HUGHES.